Dec. 30, 1924.  1,520,764
W. NATHANSON ET AL
METHOD OF MAKING SEAMLESS PIPE CONNECTIONS
Filed Nov. 23, 1922   2 Sheets—Sheet 1
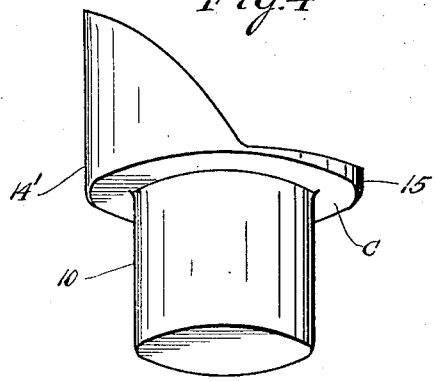
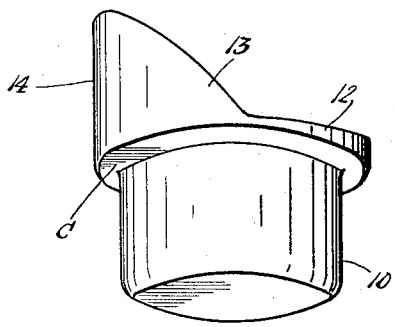
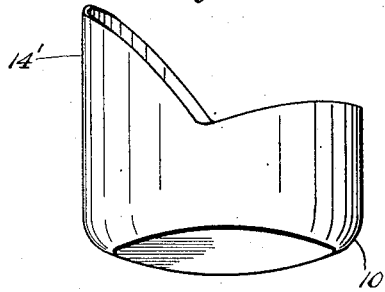
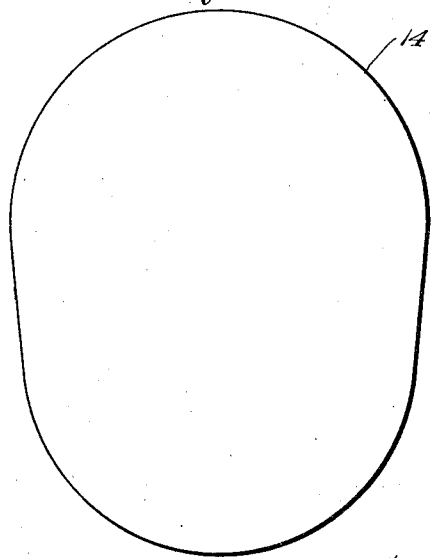
Witnesses:
Inventors:
William Nathanson &
Jack Behm
Their Attorney Patented Dec. 30, 1924.

1,520,764

UNITED STATES PATENT OFFICE.

WILLIAM NATHANSON AND JACK BEHM, OF CHICAGO, ILLINOIS, ASSIGNORS, BY MESNE ASSIGNMENTS, OF ONE-THIRD TO WILLIAM NATHANSON, ONE-THIRD TO JACK BEHM, AND ONE-THIRD TO OTTO A. ZINKE, ALL OF CHICAGO, ILLINOIS.

METHOD OF MAKING SEAMLESS PIPE CONNECTIONS.

Application filed November 23, 1922. Serial No. 602,876.

*To all whom it may concern:*

Be it known that we, WILLIAM NATHANSON and JACK BEHM, citizens of the United States, and residents of the city of Chicago, county of Cook, and State of Illinois, respectively, have invented certain new and useful Improvements in Methods of Making Seamless Pipe Connections, of which the following is a specification.

Our invention relates to an improved method of making seamless pipe connections, and especially relates to a method of making and forming a seamless pipe stud connection for an automobile radiator commonly known as the inlet pipe, and has for its principal object the provision of an improved method of this character which will be highly efficient in use and economical in manufacture.

A further object of the invention is the provision of a method of making and forming a pipe connection of this character from a flat sheet of material; forming the pipe connection in such manner so as to avoid seams and solder or like joints.

Other objects will appear hereinafter.

The invention consists in the combinations and arrangements of parts hereinafter described and claimed.

The invention will be best understood by reference to the accompanying drawings forming a part of this specification, and in which, Fig. 1, is a plan view of the blank from which our seamless pipe is formed;

Fig. 2, is a perspective view of the seamless pipe connection in its state after the first operation on the blank;

Fig. 3, is a perspective view of the seamless pipe connection in its state after the second operation;

Fig. 4, is a perspective view of the seamless pipe connection in its state after the third operation;

Figure 6:
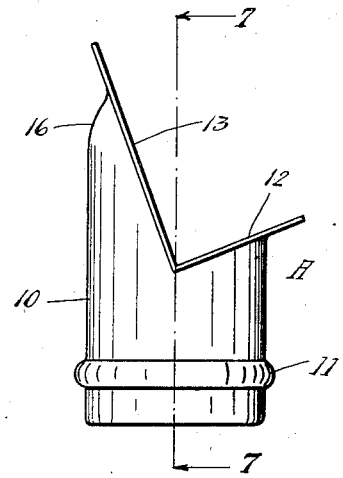
Fig. 6, is a side elevational view of the seamless pipe connection as a finished product.
Figure 7:
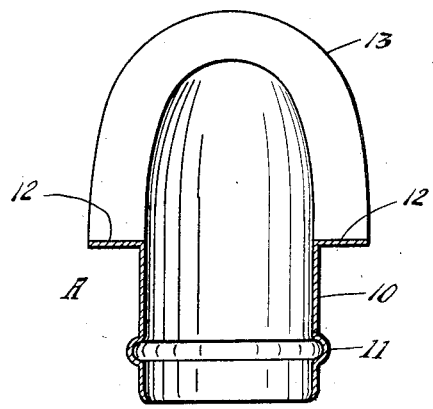
Fig. 7, is a sectional view of the seamless pipe connection taken substantially on line 7—7 of Fig. 6.

Referring to Figs. 6 and 7 showing the finished product of the invention 10 indicates the shank of the pipe connection A, 11 a bead formed in the shank to assist in retaining a hose (not shown) on the shank, and 12 and 13 indicate flanges disposed substantially at right angles with respect to each other and inclined relatively to the central axis of the pipe connection A. The reference characters as above applied will be used when required in setting forth the various operations of our method of forming the seamless pipe connection.

Referring now to Figs. 1 to 5 inclusive, especially to Fig. 1, 14 indicates an oval shaped blank of suitable material, preferably of brass, for the reasons that we find that brass can be more economically drawn than other analogous material. The first operation in forming the pipe connection A consists of operating on the blank 14 with a suitable die (not shown) which when brought down in hammer like fashion will cause the blank 14 to take the shape as illustrated in Fig. 2, which is substantially in the shape of a cup. The next operation consists, through the medium of a suitable die, of reducing the diameter of the greater portion of the cup thus formed, forming the pipe shank 10, and at the same time increasing the length of the cup. As will be noted in Fig. 3, there remains a rim portion C, and upwardly extending lip like portion 14. At the completion of this operation it will be seen by inspection of Fig. 3, that the flanges 12 and 13 are beginning to take form.

Figure 5:
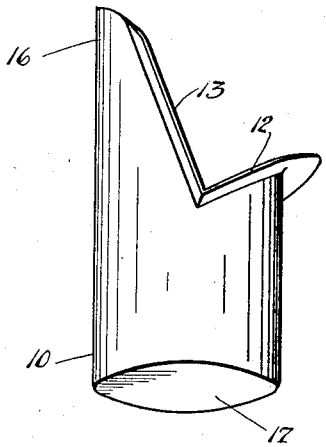
Fig. 5, is a perspective view of the seamless pipe connection in its state nearing completion.

The third operation in forming the seamless pipe connection, the results being illustrated in Fig. 4, is in substance the same as the second operation, namely reducing the diameter and increasing the length of the shank, the results of the second operation being illustrated in Fig. 3. After the shank 10 has been reduced and lengthened by the third operation the next step, which is accomplished through the medium of a suitable die is that of drawing the lip like portion 14' flush with the reduced shank portion 10, and at the same time drawing the portion 15, constituting the flange 12, substantially at right angles with respect to the flange 13, formed at the completion of the fourth operation. At the completion of this operation we have the pipe connection in the form illustrated in Fig. 5 with the flanges 12 and 13 disposed substantially at right angles with respect to each other and inclined inwardly with respect to the central axis of the shank 10. The upper portion of the shank 10 as indicated at 16 is curved inwardly by a suitable die, for this purpose, completing the flange 13. The bead 11 is now formed in the shank 10 by a method well known in the art and the results of the last operation terminates in the form of a pipe as illustrated in Fig. 6 having the shank portion 10 and flanges 12 and 13 disposed substantially at right angles with respect to each other. At the completion of the last operation in order to form a passage through the pipe 10, the metal portion 17 of the shank 10, Fig. 5, is removed.

The dies employed in carrying into effect our improved method can be of any suitable construction which will accomplish the best results at an economical cost.

Those familiar with the art of making pipes for the purposes herein specified can readily see and appreciate the value of our invention and it need only be mentioned here that the pipe when completed is seamless and durable and can be manufactured at a nominal cost, and while we describe an automobile radiator inlet pipe to set forth our invention it is to be understood that other analogous pipe can likewise be formed in the same manner.

While we have illustrated and described the preferred form of construction for carrying our invention into effect, this is capable of variation and modification without departing from the spirit of the invention, we, therefore, do not wish to be limited to the precise details of construction set forth, but desire to avail ourselves of such variations and modifications as come within the scope of the appended claims.

Having described our invention, what we claim as new and desire to secure by Letters Patent is:

1. A method of making a seamless and jointless pipe from a metal blank and comprising the drawing of said blank in substantially cup shape, reducing the diameter of the closed portion of the cup to form a shank, and lengthening said shank portion and drawing the unreduced portion of said cup to form a curved end portion with flanges extending at an angle to each other.

2. A method of making a pipe from a blank substantially oval in shape consisting of drawing the blank in substantially cup shape, reducing the diameter of a portion of the cup forming a shank, further reducing the diameter and lengthening said shank portion and drawing the unreduced portion of said cup to form a curved end portion and flanges disposed substantially at right angles with respect to each other.

3. A method of making a pipe from a blank substantially oval in shape consisting of drawing the blank in substantially cup-shape, reducing the diameter of the closed portion of the cup to form a shank, further reducing the diameter and lengthening said shank and drawing the unreduced portion of said cup to form a curved end portion with a flange extending substantially longitudinally of said pipe and another flange extending at right angles to the first flange.

4. A method of making a seamless and jointless connector tube from a flat blank, said method comprising the drawing of said blank to substantially cup shape with a reduced shank portion at the closed end, and drawing the reduced portion at the open end to form an end portion with flanges extending at an angle to each other and adapted for connecting said tube to the corner edge of an automobile radiator.

In testimony whereof we have signed our names to this specification in the presence of a subscribing witness.

WILLIAM NATHANSON.
JACK BEHM.

Witness:
JOSHUA R. H. POTTS.